United States Patent [19]

Kobayashi et al.

[11] 4,441,178
[45] Apr. 3, 1984

[54] METHOD OF CORRECTING A POSITION OF A DISK RECORD ON A TURNTABLE

[75] Inventors: Kozo Kobayashi; Hiromu Meguro, both of Kodaira, Japan

[73] Assignee: Nakamichi Corporation, Tokyo, Japan

[21] Appl. No.: 343,878

[22] Filed: Jan. 29, 1982

[30] Foreign Application Priority Data

Feb. 2, 1981 [JP] Japan .................................. 56-14081
Feb. 3, 1981 [JP] Japan .................................. 56-14860
Mar. 10, 1981 [JP] Japan .................................. 56-34213

[51] Int. Cl.³ .......................... G01B 7/00; G11B 25/04
[52] U.S. Cl. .................................... 369/270; 346/137; 369/58; 369/233; 369/258; 369/263; 369/264
[58] Field of Search ............... 369/263, 264, 265, 270, 369/271, 258, 244, 233, 240, 58; 346/137

[56] References Cited

U.S. PATENT DOCUMENTS 1,853,650  4/1932  Zullo .................................... 369/263
2,505,630  4/1950  Weathers ............................. 369/240
3,000,005  9/1961  Moyer .................................. 369/58
3,503,615  3/1970  Matsuda ............................... 369/33
4,164,075  8/1979  Hunyar ................................. 369/58

FOREIGN PATENT DOCUMENTS 2301011  8/1973  Fed. Rep. of Germany ...... 369/240
334679   9/1930  United Kingdom ............... 369/263

Primary Examiner—Steven L. Stephan
Attorney, Agent, or Firm—Pearne, Gordon, Sessions, McCoy, Granger & Tilberry

[57] ABSTRACT

This invention pertains to a method of correcting a position of a disk record on a turntable for positioning the record on the turntable in a concentric manner relative to the rotational center of the turntable.

In the method of the invention, a stylus which is mounted on a pickup arm traces a groove of a record placed on a turntable. On tracing the groove of the record, an angular displacement of the pickup arm is detected for detecting an eccentricity of the record relative to the rotational center of the turntable. The position of the record on the turntable is corrected in accordance with the detected eccentricity.

12 Claims, 5 Drawing Figures

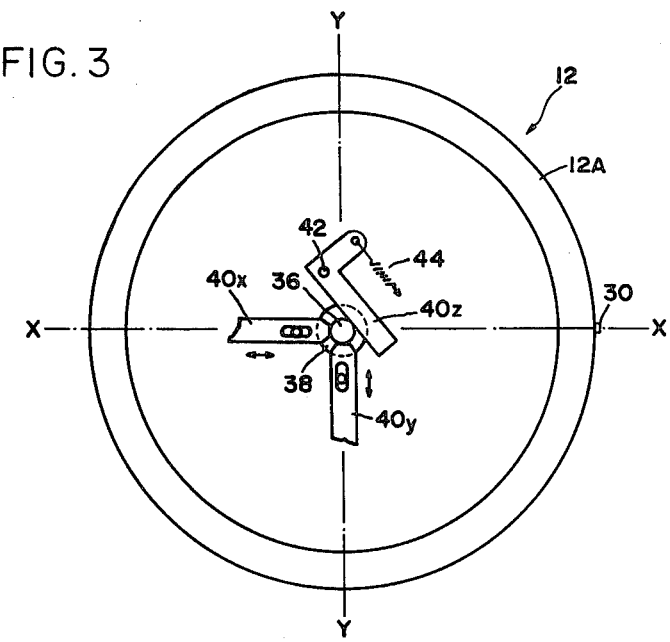
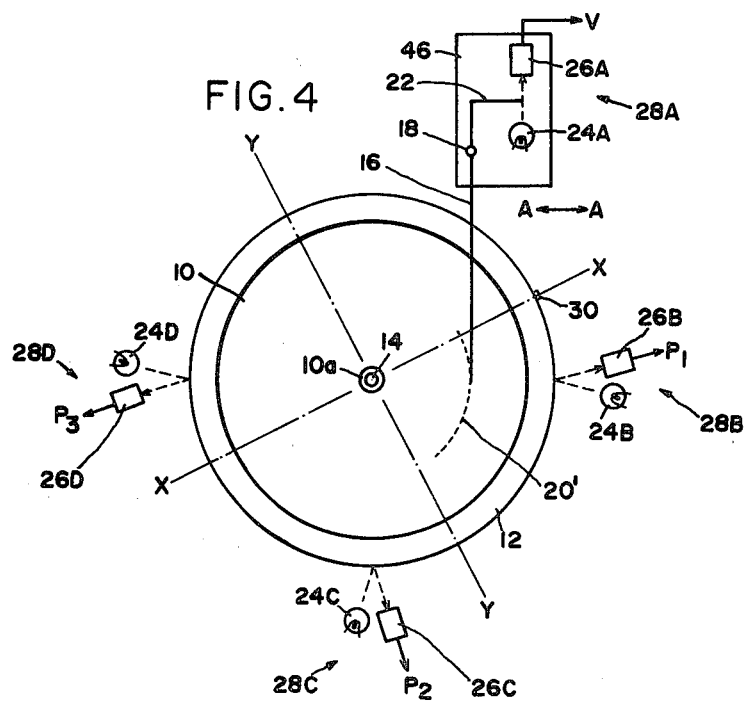

METHOD OF CORRECTING A POSITION OF A DISK RECORD ON A TURNTABLE

BACKGROUND OF THE INVENTION

On reproducing a disk record by a record player, it is required to place the record on a turntable in a concentric manner relative to the rotational center of the turntable because, if otherwise, a wow occurs due to an off-center rotation of the record whereby the reproducing characteristic of the record is deteriorated.

To this end, in general, the turntable has a center spindle provided thereon, and the record is placed on the turntable so that a center hole of the record engages the center spindle of the turntable. The diameters of the spindle and the center hole are standardized.

However, in the Industrial Standards, the center of the center hole is allowed to be distant from the center of the groove spiral within 0.2 mm. Also, concerning LP record for example, the diameter of the center hole is allowed to vary from 7.24 to 7.33 mm while the diameter of the center spindle is allowed to vary from 7.05 to 7.15 mm. Thus, it will be noted that a clearance between the center spindle and the center hole always occurs in placing the record on the turntable. It will be also noted that the clearance will be much greater in accordance with the combination of the record and the record player used.

Thus, it will be understood that it is difficult to place the record on the turntable in a concentric manner relative to the rotational center of the turntable only by engaging the center hole of the record with the center spindle of the turntable. In a prior art, it is usual to place the record on the turntable in an eccentric manner, and the degree of eccentricity of the record relative to the rotational center of the turntable disadvantageously depends on how the record is placed on the turntable.

SUMMARY OF THE INVENTION

Accordingly, it is a principal object of the invention to provide a method of automatically correcting a position of a record on a turntable in a concentric manner relative to the rotational center of the turntable.

In accordance with the invention, there is provided a method of correcting a position of a record on a turntable comprising the steps of tracing a groove of said record by a stylus mounted on a pickup arm so that said pickup arm is angularly displaced in accordance with the eccentricity of said record relative to the rotational center of said turntable; detecting an angular displacement of said pickup are while said groove is traced and obtaining eccentric information of said record relative to the rotational center of said turntable and correcting said position of said record in accordance with said eccentric information whereby said record on said turntable is placed in a concentric manner relative to said rotational center of said turntable.

BRIEF DESCRIPTION OF THE DRAWINGS

The above features of the invention will be apparent from the description of the embodiments taken along with reference to the accompanying drawings in which;

FIG. 3 is an enlarged bottom view of the turntable of FIG. 2;

FIG. 4 illustrates how to detect an eccentricity of a record relative to a rotational center of a turntable in accordance with another embodiment of the invention.

DETAILED DESCRIPTION OF THE EMBODIMENTS

Figure 1:
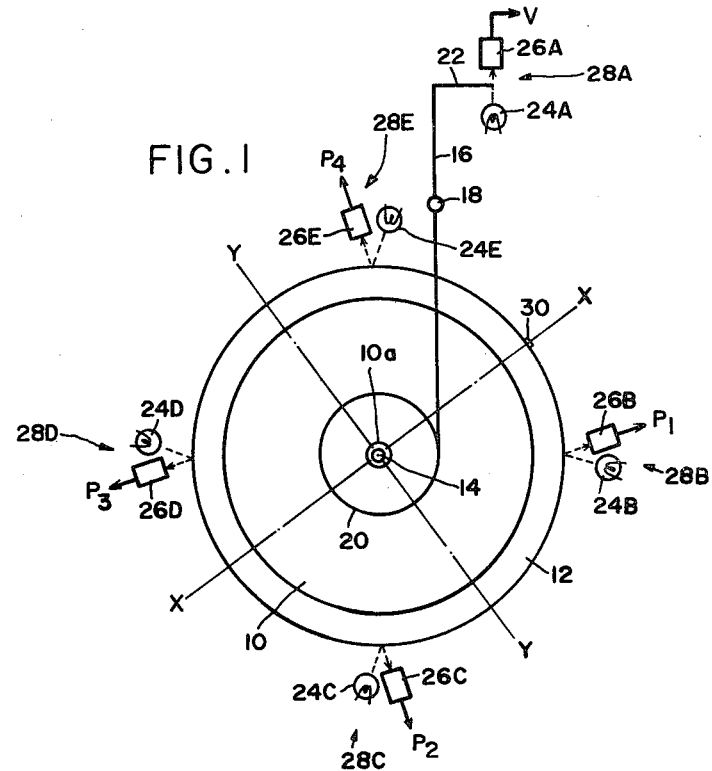
FIG. 1 illustrates how to detect an eccentricity of a record relative to a rotational center of a turntable in accordance with one embodiment of the invention.

FIG. 1 illustrates how to detect an eccentricity of a record 10 relative to a rotational center of a turntable 12 for positioning the record 10 on the turntable 12 in a properly concentric manner relative to the rotational center of the turntable 12. The record 10 has a center hole 10a provided therein and is placed on the turntable 12 so that the center hole 10a engages a center spindle 14 of the turntable 12.

A pickup arm 16 is pivotally mounted about a supporting axis 18 and has a stylus (not shown) provided at a leading end thereof. For detecting the eccentricity of the record 10 on the turntable 12, the stylus traces a circular finishing groove 20 of the record 10 so that the pickup arm 16 is angularly moved about the supporting axis 18 in accordance with the eccentricity of the record. The pickup arm 16 is provided at the other end thereof with a shutter plate 22 which is disposed across a light passage between a luminous element 24A such as a lump and a photo-electric element 26A such as a photo diode. The luminous element 24A and the photo-electric element 26A forms a photo-electric sensor 28A which generates an electric signal V varying in its level depending variation in a quantity of light passing through the light passage in accordance with an angular displacement of the pickup arm 16. Since the photo-electric sensor is well known, the detailed description of it will be omitted.

Four sets of photo-electric sensors 28B to 28E are provided at an angular distance of 90° each other. Each of the photo-electric sensors 28B to 28E comprises luminous elements 24B to 24E such as lumps and photo-electric elements 26B to 26E such as photo diodes, respectively, which are fased with a periphery of the turntable 12 so that the light from the luminous elements is received by the corresponding photo-electric elements after reflected by a reflecting member 30 securely attached to the periphery of the turntable 12 at one point thereof. Thus, it will be noted that the four photo-electric sensors 28B to 28E generate position signals $P_1$ to $P_4$ from the respective photo-electric elements 26B to 26E when the reflecting member 30 reaches the respective sensing points of the sensors 28B to 28E. As noted from FIG. 1, the pickup arm 16 is so positioned that the stylus is located on a line which connects two sensing points of the photo-electric sensors 28B and 28D.

When the four photo-electric sensors 28B to 28E generate the respective position signals $P_1$ to $P_4$ during one revolution of the turntable 12, the photo-electric sensor 28A generates respective electric signals $V_1$ to $V_4$ having a level which responds to the angular displacement of the pickup arm 16. Thus, it will be noted that the electric signals $V_1$ and $V_3$ indicate the eccentricity of the record 10 relative to the rotational center of the turntable 12 in the direction of X—X which is on the line of connection of the rotational center of the turntable 12 and the reflecting member 30, while the electric signals $V_2$ and $V_4$ indicate the eccentricity of the record 10 relative to the rotational center of the turntable 12 in the direction of Y—Y which is on the line perpendicular to the line X—X. Thus, by arithmetically operating the electric signals $V_1$ to $V_4$, eccentric information in the form of control signals $\Delta V_x$ and $\Delta V_y$ can be obtained from the following expressions (1) and (2);

$$\Delta V_x = \frac{V_1 - V_3}{2} \quad (1)$$

$$\Delta V_y = \frac{V_2 - V_4}{2} \quad (2)$$

It should be noted that the absolute value and the plus or minus of the control signals $\Delta V_x$ and $\Delta V_y$ indicate the quantity and the direction of the eccentricity of the record 10 relative to rotational center of the turntable 12, respectively.

Figure 2:
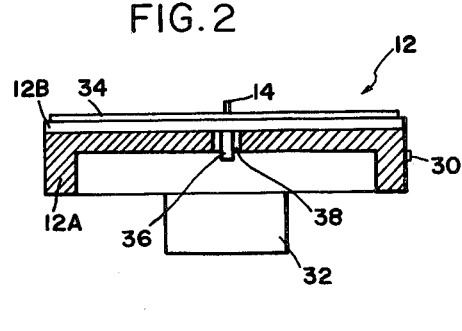
FIG. 2 is an elevational view of a turntable used for the invention with a portion sectionally broken.

As noted from FIGS. 2 and 3, the turntable 12 may be of composite construction and may comprise a main platter 12A which is to be driven by an electric motor 32 and an auxiliary platter 12B which is slidably mounted on the main platter 12A. As shown in FIG. 2, the reflecting member 30 is provided on the periphery of the main platter 12A. Also, as shown in FIG. 2, the auxiliary platter 12B has the center spindle 14 provided at the center of the upper surface of the auxiliary platter 12B where a rubber sheet 34 is placed to place the record thereon, and also has a cylindrical engaging rod 36 provided at the center of the bottom surface of the auxiliary platter 12B. As noted from FIG. 2, the engaging rod 36 extends through a hole 38 provided in the main platter 12A at the center thereof and having a diameter fully larger than that of the engaging rod 36. The engaging rod 36 protrudes beyond the bottom surface of the main platter 12A as shown in FIG. 2.

As shown in FIG. 3, two engaging members 40x and 40y may be slidably disposed on the bottom surface of the main platter 12A along the lines X—X and Y—Y which are determined by the rotational center of the turntable 12 and the reflecting member 30, respectively. The leading ends of the engaging members 40x and 40y engage the engaging rod 36 as shown in FIG. 3. The engaging members 40x and 40y may be individually slidably moved by respective cam means not shown which are driven by electric motors also not shown, through coupling means also not shown. Thus, the engaging members 40x and 40y are forced against the engaging rod 36. An L-shaped lever 40x is rotatably supported on and about a supporting axis 42 by action of a spring 44. The lever 40z forms counter means which resiliently engages the engaging rod 36 against the composite forcing power from the engaging members 40x and 40y. It will be understood that drive means such as the electric motors and the cam means should be mounted on the bottom surface of the main platter 12A together with the engaging members 40x and 40y so that they are rotatably moved together with the main platter 12A.

The control signals $\Delta V_x$ and $\Delta V_y$ which indicate the eccentricity of the record 10 relative to the rotational center of the turntable 12 are applied to the electric motors for the engaging members 40x and 40y to control the cam means to thereby slidably move the engaging members 40x and 40y so that the record 10 on the auxiliary platter 12B is correctly placed on the main platter 12A in a concentric manner relative the rotational center of the turntable 12.

FIG. 4 illustrates another embodiment of the invention in which the pickup arm 16 is pivotally mounted about the supporting axis 18 on a base plate 46 which is slidably moved in a direction of A—A in FIG. 4 by a linear trucking system. A reproducing stylus (not shown) at the leading end of the pickup arm 16 traces a spiral sound groove 20' which is cut by a recording stylus in accordance with a variable pitch recording system. In this recording system, the sound groove 20 on which a recording signal having a level less than a predetermined level is cut with a small constant pitch by the recording stylus moving at constant speed. Thus, the sound groove 20' can be easily distinguished by observing the sound groove of the record 10 or detecting the level of the reproduced signal. Three photo-electric sensors 28B to 28D which comprise the luminous elements 24B to 24D and the photo-electric elements 26B to 26D are provided around the periphery of the turntable 12. The sensors 28B and 28D are disposed at the angle distance of 180° each other while the sensor 28C is disposed at the angle distance of 90° relative to the sensors 28B and 28D. The three photo-electric sensors 28B to 28D generate position signals $P_1$ to $P_3$ when the reflecting members 30 reaches the respective sensing points of the sensors 28B to 28D. As noted from FIG. 4, the pickup arm 16 is so positioned that the stylus tracing the sound groove 20' is located on a line which connects two sensing points of the photo-electric sensors 28B and 28D.

Figure 5:
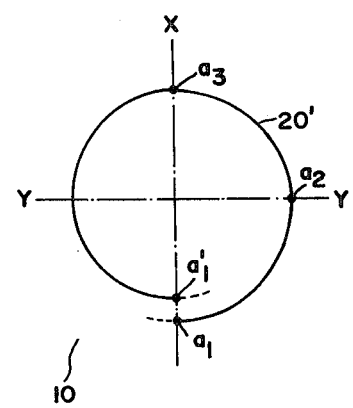
FIG. 5 illustrates a locus along which a stylus traces a record in the embodiment of FIG. 4.

The three photo-electric sensors 28B to 28D generate the respective position signals $P_1$ to $P_3$ and the first sensor 28B generates the position signal $P_1'$ again during one revolution of the turntable 12 while the stylus traces the spiral groove 20'. When the position signals $P_1$ to $P_3$ and $P_1'$ are generated, the photo-electric sensor 28A generates respective electric signals $V_1$ to $V_3$ and $V_1'$ having a level which responds to the angular displacement of the pickup arm 16. It will be noted that the electric signals $V_1$ to $V_3$ and $V_1'$ indicate the informations at the points $a_1$ to $a_3$ and $a_{1'}$ of the record 10, respectively, as shown in FIG. 5. It will be also noted that the electric signals $V_1$, $V_3$ and $V_1'$ indicate the eccentricity of the record 10 relative to the rotational center of the turntable 12 in the direction of X—X which is on the line of connection of the rotational center of the turntable 12 and the reflecting member 30, while the electric signal $V_2$ indicates the eccentricity of the record 10 relative to the rotational center of the turntable 12 in the direction of Y—Y which is on the line perpendicular to the line X—X. If the record 10 is placed on the turntable 12 in a concentric manner relative to the turntable 12, then the relation of $V_1 < V_2 < V_3 < V_1'$ is accomplished and also the following expressions are met;

$$V_2 = V_1 + \frac{V_1' - V_1}{4} \quad (3)$$

$$V_3 = V_1 + \frac{V_1' - V_1}{2} \quad (4)$$

Thus, by arithmetically operating the electric signals $V_1$ to $V_3$ and $V_1'$, control signals $\Delta V_x$ and $\Delta V_y$ can be obtained from the following expressions (5) and (6).

$$\Delta Vx = V_2 - \left(V_1 + \frac{V_1' - V_1}{4}\right) \quad (5)$$

$$\Delta Vy = V_3 - \left(V_1 + \frac{V_1' - V_1}{2}\right) \quad (6)$$

It should be noted that the absolute value and the plus or minus of the control signals ΔVx and ΔVy indicate the quantity and the direction of the eccentricity of the record 10 relative to the rotational center of the turntable 12, respectively.

It will be understood that the record 10 may be automatically displaced on the turntable 12 in a concentric manner by using the control signals ΔVx and ΔVy in the same manner as aforementioned with respect to the embodiment of FIGS. 2 and 3.

Although two embodiments of the invention have been described and illustrated with reference to the accompanying drawings, it will be understood by those skilled in the art that they are by way of example, and that various changes and modifications may be made without departing from the spirit and scope of the invention. For example, although, in the illustrated embodiment, the turntable is of dual structure having the main and auxiliary platters and the position of the disk record is corrected during the rotation of the turntable by displacing the auxiliary platter on which the record is placed, with the engaging members on the main platter slidably moved in accordance with the control signals ΔVx and ΔVy, the auxiliary platter may be displaced by a displacement member provided on a chassis, after the rotation of the turntable is stopped at the predetermined position. The turntable may be of conventional structure and, in this case, the record may be displaced directly by a displacement member provided on the chassis, after stopping the rotation of the turntable at the predetermined position. Mechanical means including the engaging rod and the engaging members for displacing the auxiliary platter of the turntable may be replaced by electromagnetic means. Also, in the embodiment of FIG. 2, the position of the stylus tracing the finishing groove, the sensing position of the photo-electric sensors and the number of these sensors may be determined on the various designs under a predetermined caluculation. In the embodiment of FIG. 4, the spiral groove which is traced by the stylus may be replaced by another groove such as a lead-in groove or a lead-out groove as cut by the recording stylus moving at constant speed. Thus, it should be understood that the invention is not limited to the embodiments and that it is intended to be defined only to the appended claims.

What is claimed is:

1. A method of correcting a position of a record on a turntable comprising the steps of:
   tracing a groove of said record by a stylus mounted on a pickup arm so that said pickup arm is angularly displaced in accordance with the eccentricity of said record relative to the rotational center of said turntable;
   detecting an angular displacement of said pickup arm while said groove is traced and obtaining eccentric information of said record relative to said rotational center of said turntable; and
   correcting said position of said record in accordance with said eccentric information whereby said record on said turntable is placed in a concentric manner relative to said rotational center of said turntable.

2. A method of correcting a position of a record on a turntable as set forth in claim 1, said groove being a circular finishing groove portion in said record.

3. A method of correcting a position of a record on a turntable as set forth in claim 2, wherein said angular displacement of said pickup arm is sensed by a photoelectric senser having a light passage interrupted by a shutter on an end of said pickup arm.

4. A method of correcting a position of a record on a turntable as set forth in claim 3, wherein said angular displacement of said pickup arm is sensed everytime said turntable is rotated through an angle of 90°.

5. A method of correcting a position of a record on a turntable as set forth in claim 4, wherein a reflecting member is provided on the periphery of the turntable and wherein rotation of said turntable through an angle of 90° is sensed by four photo-electric sensors provided at locations spaced 90° apart around the periphery of said turntable and each comprising a luminous element and a photo-electric element to receive light from said luminous element reflected by said reflecting member.

6. A method of correcting a position of a record on a turntable as set forth in claim 4, wherein sequential electric signals $V_1$ to $V_4$ detected from said photo-electric sensor in accordance with successive 90° arcuate rotations of the turntable are arithmetically operated so that the following eccentric information ΔVx and ΔVy are obtained:

$$\Delta Vx = \frac{V_1 - V_3}{2} \text{ and } \Delta Vy = \frac{V_2 - V_4}{2}$$

7. A method of correcting a position of a record on a turntable as set forth in claim 1, said turntable comprising a main platter and an auxiliary platter slidably movable on said main platter and on which said record is placed and said auxiliary platter is displaced in accordance with said eccentric information.

8. A method of correcting a position of a record on a turntable as set forth in claim 1, said groove being a spiral groove portion cut by a recording stylus moving at contant speed.

9. A method of correcting a position of a record on a turntable as set forth in claim 8, wherein said angular displacement of said pickup arm is sensed by a photo-electric sensor having a light interrupted by a shutter on an end of said pickup arm.

10. A method of correcting a position of a record on a turntable as set forth in claim 9, wherein said angular displacement of said pickup arm is sensed at a first point which is an initiating point of rotation of said record during one revolution, at a second point which is a terminating point of rotation of said record during one revolution, at a third point which is at the angle of 180° relative to said first and second points and at a fourth point which is other than said first to third points.

11. A method of correcting a position of a record on a turntable as set forth in claim 10, wherein a reflecting member is provided in said periphery of said turntable and wherein said first to fourth points are sensed by four photo-electric sensors provided around the periphery of said turntable and each comprising a luminous element and a photo-electric element to receive light from said luminous element reflected by said reflecting member.

12. A method of correcting a position of a record on a turntable as set forth in claim 9, wherein sequential electric signals $V_1$ to $V_3$ and $V_1'$ detected from said photo-electric sensor in accordance with said four points are arithmetically operated so that the following eccentric information $\Delta Vx$ and $\Delta Vy$ are obtained:

$$\Delta Vx = V_2 - \left(V_1 + \frac{V_1' - V_1}{4}\right) \text{ and}$$

$$\Delta Vy = V_3 - \left(V_1 + \frac{V_1' - V_1}{2}\right)$$

* * * * *